United States Patent [19]
Griffin et al.

[11] Patent Number: 5,463,334
[45] Date of Patent: Oct. 31, 1995

[54] ARBITRARY WAVEFORM GENERATOR

[75] Inventors: Maurice J. Griffin, Tiverton; Glenn S. Sugawara, Portsmouth, both of R.I.

[73] Assignee: The United States of America as represented by the Secretary of the Navy, Washington, D.C.

[21] Appl. No.: 382,708

[22] Filed: Feb. 2, 1995

[51] Int. Cl.$^6$ .................................................. H03K 3/84
[52] U.S. Cl. ........................................... 327/106; 327/164
[58] Field of Search ..................................... 327/106, 164

[56] References Cited

U.S. PATENT DOCUMENTS

| | | | |
|---|---|---|---|
| 4,484,296 | 11/1984 | Triese et al. | 327/106 |
| 4,656,428 | 4/1987 | Ishikawa | 327/164 |
| 4,943,779 | 7/1990 | Pedersen et al. | 327/106 |
| 5,218,225 | 6/1993 | Zanders | 257/538 |
| 5,243,535 | 9/1993 | Bolan et al. | 364/482 |
| 5,297,056 | 3/1994 | Lee et al. | 364/482 |

FOREIGN PATENT DOCUMENTS

| | | | |
|---|---|---|---|
| 361224719 | 10/1986 | Japan | 327/106 |
| 0773915 | 10/1980 | U.S.S.R. | 327/164 |

*Primary Examiner*—Margaret Rose Wambach
*Attorney, Agent, or Firm*—Michael J. McGowan; Prithvi C. Lall; Michael F. Oglo

[57] ABSTRACT

A system for storing an arbitrary waveform on non-volatile random access memory (NVRAM) device and generating an analog signal using the NVRAM device. A central processing unit is used to synthesize an arbitrary waveform and create a digital representation of the waveform and transfer the digital representation to a microprocessor which, in turn, writes the digital data into an NVRAM device which has been mapped into a portion of the microprocessor address space. The NVRAM device is removed address space and placed into an independent waveform generation unit. In the waveform generation unit, an address clock provides an address timing signal and a cycle clock provides a transmit signal. Both signals are applied to an address generator. When both signals are present, the address generator generates and transmits to the NVRAM device a new address for each cycle of the address timing signal. In response to each new address generated, the NVRAM devices provides a digital output which is applied to a digital to analog converter. The converter produces a continuous analog output which is smoothed by a filter to produce the arbitrary waveform.

10 Claims, 4 Drawing Sheets

```
}
while((nread = getrec(ifp, indat)) == RECLEN) {
    cptr = &1o_ram_val;
    checksum = RECLEN;
    checksum += *cptr++;
    checksum += *cptr;
    fprintf( ofp, ":%.2x%.2x00", RECLEN, 1o_ram_val );
    for( i=0; i<RECLEN; i++) {
        c = *(indat+i);
        outdat[i].u[0] = c ^ OFFSET;
        outdat[i].u[0] = ~outdat[i].u[0];
        checksum += outdat[i].u[0];
        fprintf( ofp, "%.2x", outdat[i].u[0] );
    }
    checksum = (~checksum)+1;
    fprintf( ofp, "%.2x\n", checksum );
    1o_ram_val += RECLEN;
}
fprintf( ofp, ":00000001FF\n" );
}

/**********************************************/
getrec( ifp, indat )
FILE *ifp;
double *indat;
{
    int i;
    int nread;

for(i=0; i<RECLEN; i++) {
        if( fscanf( ifp, "%1f", indat++) !=1)
            return(i);
    }
    return(i);
}
```

FIG. 4

ARBITRARY WAVEFORM GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the storage and generation of arbitrary waveforms. More particularly, the invention relates to a system for storing a digital representation of an analog waveform and for generating a desired analog waveform from the stored digital data.

(2) Description of the Prior Art

There are many applications which require the production of arbitrary waveforms. For example, arbitrary waveforms are often used to calibrate and/or to test the response of various devices to specific signals (waveforms). In such applications, an arbitrary waveform generator produces a desired output waveform and the response to the waveform is measured and analyzed, enabling one to modify or correct the device.

Often such testing and calibration must be performed in remote locations. In such locations, it is desirable to have a small, portable, rugged device available to synthesize and generate complex arbitrary waveforms. For example, the U.S. Navy uses arbitrary waveform generators to produce sonar waveforms which are used to calibrate and test acoustic sensors, unmanned underwater vehicles, and counter measure devices. These applications, which are often performed at sea, require the production of complex arbitrary waveforms at various locations and depths. Additionally, because nearby objects such as the hull of a ship can cause echoes which interfere with the waveform, the waveform generator should be operated at a distance from nearby objects, thus directing a need for small, portable devices which require little power to operate. Furthermore, because it is often necessary to synthesize waveforms during the testing, the waveform generator should be relatively easy to program.

Arbitrary waveform generators presently in use fall into two general categories, frequency synthesizers and read only memory (ROM) devices. While frequency synthesizers and ROM devices are capable of providing the analog waveforms necessary for calibrating or testing various devices, they generally suffer from one or more disadvantages which limit their use for many applications. Frequency synthesizers are generally costly, bulky and fragile instruments limited to laboratory use. Frequency synthesizers also tend to be tedious and time consuming to program for the generation of arbitrary waveforms. Thus, frequency synthesizers are unattractive for applications requiring a rugged, portable waveform generator to produce complex, arbitrary waveforms which cannot be well defined using mathematical formulas.

ROM devices generally require sophisticated hardware and software for programming and are often used under microprocessor control for playback. Microprocessor programmed control of the output waveform generally requires the addition of timer loops and adds interrupt service overhead, thus reducing the availability of the microprocessor to perform other tasks. The microprocessor and ROM programmer also substantially add to the weight, cost and power consumption of ROM based waveform generators. The size, cost, complexity and power consumption of ROM based waveform generators, as well as cost and time associated with programming ROM devices make the use of ROM based waveform generators prohibitive for generating complex, arbitrary waveforms in remote locations.

There is currently no small, portable, rugged device available to synthesize and generate arbitrary waveforms. The high cost of current waveform generators, their size, complexity, power consumption, lack of ruggedness as well as the difficulty in generating complex, arbitrary waveforms restrict the use of existing waveform generators for applications performed in remote locations.

SUMMARY OF THE INVENTION

Accordingly, it is a general purpose and object of the present invention to provide a system for storing a digital representation of an analog waveform and generating the desired analog waveform from the stored digital data.

Another object of the present invention is the provision of a system for storing a digital representation of an analog waveform and generating the desired analog waveform from the stored data without requiring relatively expensive, fragile, sizeable and/or cumbersome equipment.

A further object of the present invention is the provision of a waveform storage and generation system which can be relatively quickly and easily programmed to produce complex arbitrary waveforms.

Yet another object of the present invention is to provide a waveform storage and generation system which does not require a relatively large amount of power to operate.

Yet a further object of the present invention is the provision of a waveform storage and generation system which does not require a relatively high degree of skill or training to operate.

These and other objects made apparent hereinafter are accomplished with the present invention by providing a small, self-contained apparatus for non-volatile electrical storage of digital representations of analog waveforms on portable memory devices and an independent apparatus for generating analog waveforms using the portable memory devices in which the digital representations of the analog waveforms have been stored.

The storage apparatus comprises a portable memory device mapped into the address space of a microprocessor and a general purpose computer programmed to transfer a digital representation of an analog waveform to the microprocessor which, in turn, writes the digital data into the removable memory device. The generation system comprises a memory interface designed to receive the portable memory device, an address generator, a digital to analog converter and the appropriate timers needed to generate the required clocking signals to control the address generator as well as the transmission of addresses from the address generator to the removable memory device.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 4 shows a sample routine used to create a waveform data file from a data file comprising a series of data points conforming to amplitude values of an arbitrary waveform.

DESCRIPTION OF THE PREFERRED EMBODIMENT

Figure 1:
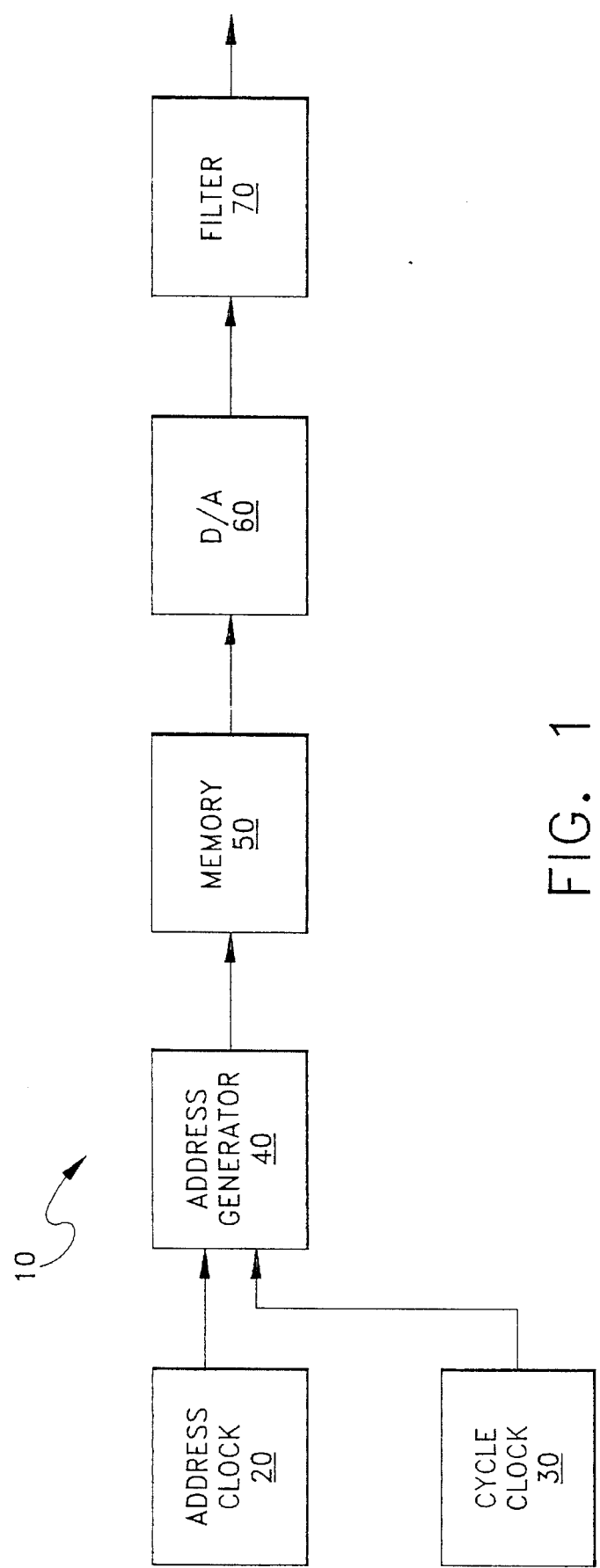
FIG. 1 shows a block diagram of an arbitrary waveform generator in accordance with the present invention.

Referring now to FIG. 1, there is shown a block diagram of an arbitrary waveform generator 10 of the present invention. In FIG. 1, address clock 20 provides an address timing signal and cycle clock 30 provides a transmit cycle signal. Both the transmit cycle signal and the address timing signal are applied to address generator 40. When the transmit cycle signal is applied, address generator 40 loads to an initial address of an address sequence. While the transmit cycle signal is present, address generator 40 generates and transmits to waveform storage/transfer section 50 a new address for each cycle of the address timing signal. In response to each new address generated, waveform storage/transfer section 50, in which a digital representation of the analog waveform is stored, provides a digital output which is applied to digital to analog converter 60. Converter 60 produces an analog output which is smoothed by filter 70 to produce the output arbitrary waveform.

Figure 2:
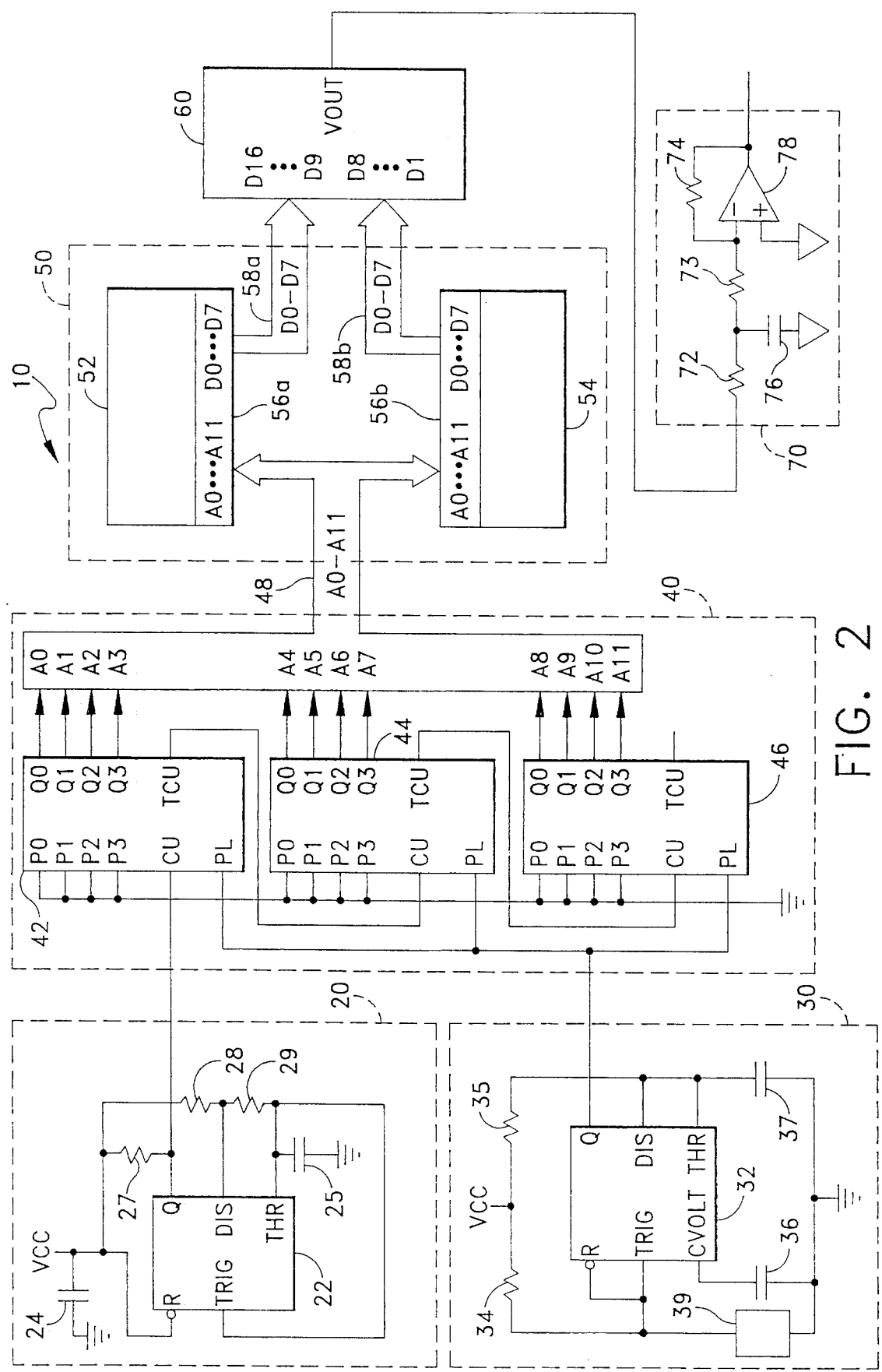
FIG. 2 shows a schematic diagram of the arbitrary waveform generator of the present invention.

The present invention is shown more particularly in FIG. 2, in which is shown a schematic diagram of an embodiment of arbitrary waveform generator 10. In FIG. 2, address clock 20 comprises address timer 22 such as an NE555 timer or the like and associated components (resistors 27, 28 and 29 and capacitors 24 and 25). The components are selected and arranged to obtain from address timer 22 a clock signal having a desired frequency for use as the address timing signal.

The frequency of the address timing signal determines the rate at which each address in the address sequence is generated and thus, the highest frequency analog waveform that the arbitrary waveform generator can produce. For example, if one assumes that eight sample points is the minimum number of points necessary to accurately define one cycle of the analog waveform through digital to analog converter 60, and a maximum analog waveform frequency of 15 KHz is needed, then an address timing signal with a frequency of 120 KHz is needed to produce the waveform. An address timing signal frequency of 120 KHz equates to a time between sample points of $8.33 \times 10^{-6}$ sec.

Cycle clock 30 comprises cycle timer 32 such as an NE555 timer or the like, resistors 34 and 35, capacitors 36 and 37 and trigger means 39. Resistors 34 and 35 and capacitors 36 and 37 are selected such that timer 32 provides a single pulse output signal for use as a transmit cycle signal. The duration of the transmit cycle signal should be long enough to enable address generator 40 to generate the address sequence necessary to produce the desired waveform but short enough so as to disable address generator 40 before the address sequence is repeated or the next address sequence begins.

Trigger means 39 which can be a mechanical switch such as a single-pole/single-throw switch, a momentary contact (pushbutton) switch or the like is provided to trigger cycle timer 32 to send the transmit cycle signal to address generator 40. Additional components such as a latch circuit or a debounce circuit can be added to provide a clean signal upon actuating the mechanical switch. Alternatively, a logic signal generated without the use of a mechanical switch can be provided as a means to trigger timer 32.

Address generator 40 comprises address counters 42, 44 and 46, such as three 74LS193 4-bit counters or the like, cascaded together to create a twelve bit counter. The twelve bit output (address bits A0–A11) from counters 42, 44 and 46 form address bus 48 through which each address in the address sequence is bused to waveform storage/transfer section 50. To enable counters 42, 44 and 46 to function as the address generator, the address timing signal generated by address clock 20 is applied to the count increment input of counter 42 and the transmit cycle signal from cycle clock 30 is applied to the load/enable inputs of counters 42, 44 and 46.

When cycle clock 30 supplies a transmit cycle signal to counters 42, 44 and 46, the counters are synchronously preset to an initial count as defined by the values present at the four data inputs P0–P3 of each counter. In FIG. 2 inputs P0–P3 of counters 42, 44 and 46 are permanently set to an initial count of zero. However, it is understood that the data inputs can be set or changed to obtain any initial count value desired. For example, by connecting one or more switches to inputs P0–P3 of the counters, one is able to set and change the inputs to obtain any initial value desired.

While the transmit cycle signal is present at counters 42, 44 and 46, each cycle (rising edge) of the address timing signal sequentially increments counters 42, 44 and 46. This increment is reflected in address bits A0–A11 such that for each cycle of the address timing signal, a new address within the address sequence is bused to waveform storage/transfer section 50. Using bits A0–A11 to address waveform storage/transfer section 50, creates a 4K addressable range (0 through 4095 decimal). However, the number of address bits can be increased, thereby increasing the addressable range of the address sequence bused to waveform storage/transfer section 50, by cascading together more counters, by using larger counters, or by a combination thereof.

Waveform storage/transfer section 50 comprises two removable Non-Volatile Random Access Memory (NVRAM) devices 52 and 54, such as Dallas Semiconductor 8K by eight bit DS1225AD chips or the like, which store the digital representation of the waveform and a pair of chip sockets 56a and 56b adapted to receive the NVRAM devices. Sockets 56a and 56b provide an interface means to electrically connect NVRAM devices 52 and 56 to arbitrary waveform generator 10 wherein the NVRAM devices can receive address bits A0–A11 from address generator 40 as well as transmit data to converter 60. Sockets 56a and 56b provide an important feature of the present invention by allowing the NVRAM devices to be easily removed or replaced, thereby enabling one to quickly and easily vary the waveform produced by the generator. Sockets 56a and 56b can also be used to provide appropriate control signals such as an output enable signal to the NVRAM devices.

NVRAM devices 52 and 54 are addressed using bits A0–A11 produced by address generator 40 such that each NVRAM device receives the same address from address bus 48. For each address received, NVRAM devices 52 and 54 each provide an eight bit digital output which is applied to digital to analog converter 60 through data buses 58a and 58b. NVRAM devices 52 and 54 are arranged in parallel (occupying the same address space) so that data buses 58a and 58b can be combined to provide a 16 bit digital representation of the waveform thereby making it possible to take advantage of the full dynamic range of the 16 bit digital to analog converter 60. With such an arrangement, one NVRAM device (e.g., NVRAM 52) contains the high order data bytes of the digital representation of the analog waveform, while the other NVRAM device (e.g., NVRAM 54) contains the low order data bytes. If only eight bits of dynamic range is required, the low order bytes can be filled with the zero code for the digital to analog converter 60. The digital representation of the desired output waveform, as well as the converter zero code, can be loaded into the NVRAM devices using a waveform storage system such as that described below in reference to FIG. 3.

The size and number of NVRAM devices are determined by the length of the waveform and the frequency of the address timing signal. For example, creating a 30 msec waveform using a 120 KHz address timing signal requires 3600 sample points stored in each NVRAM device. Waveforms having a longer duration or a higher output frequency require a larger number of sample points to accurately define the waveform. Waveforms requiring more sample points than can be stored on a single NVRAM device can be stored across two or more NVRAM devices.

Digital to analog converter 60 which can be a DAC71 digital to analog converter or the like sequentially converts the digital data transmitted from NVRAM devices 52 and 54 into analog voltages thereby producing a continuous analog signal. The analog signal is then applied to filter 70 which conditions the analog signal produced by converter 60.

Filter 70 which is a conventional RC filter with output buffering comprises resistors 72, 73 and 74, capacitor 76 and operational amplifier 78. Filter 70 conditions the output signal by removing from the signal any transient components generated in the digital to analog conversion process. It is understood that the type of filter, and therefore, the selection and arrangement of resistors, capacitors, and amplifiers can vary based upon the characteristics of the waveform produced. Such signal conditioning techniques are considered to be well known in the art of digital to analog conversion systems.

Figure 3:
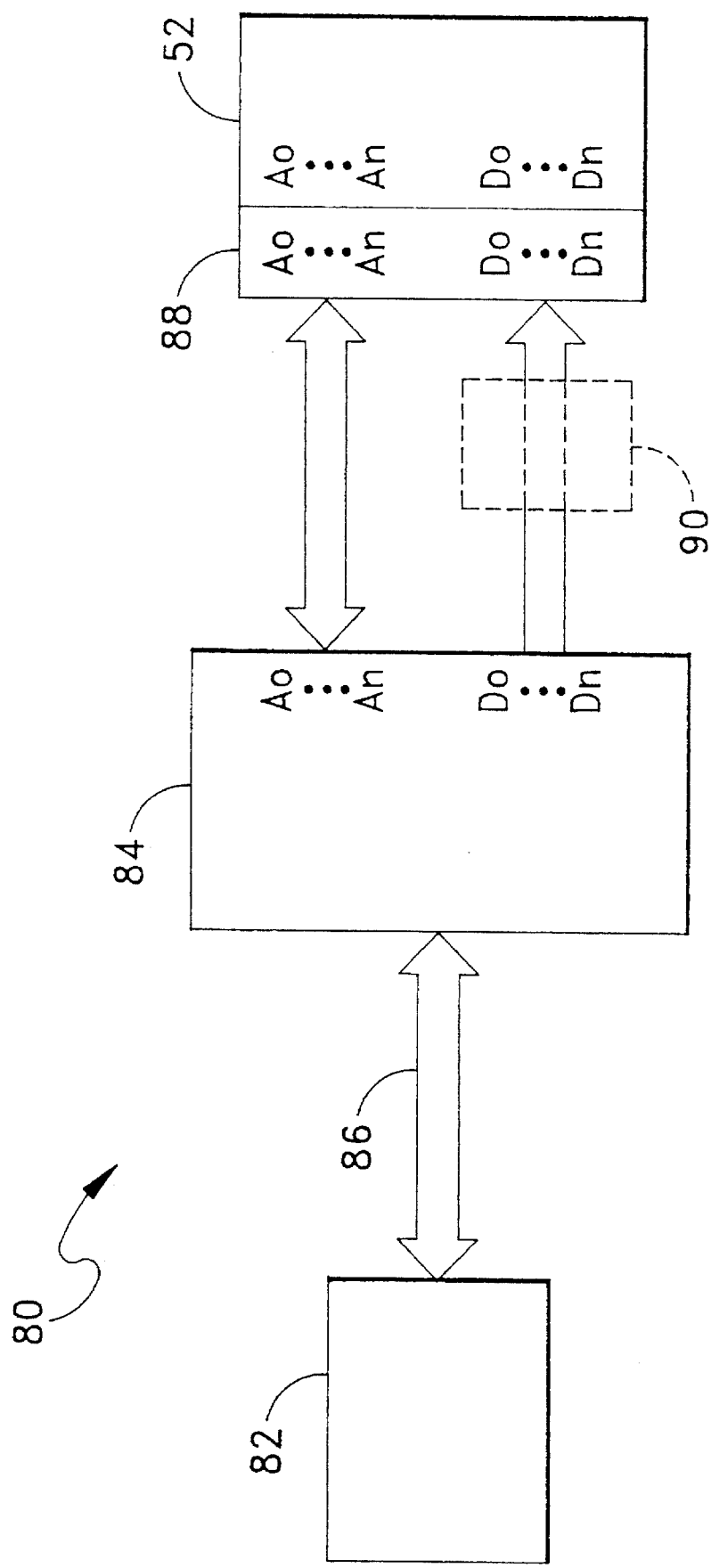
FIG. 3 shows a block diagram of a waveform storage device in accordance with the present invention.

Referring now to FIG. 3, there is shown a block diagram of a waveform storage system 80 of the present invention. A central processing unit (CPU) 82 such as a general purpose computer or the like is used to synthesize a desired waveform and create a waveform data file. The waveform data file contains a digital representation of the synthesized waveform comprising a series of sample points conforming to sequential amplitude values of the waveform along with a memory storage address for each sample point. The desired waveform is synthesized on CPU 82 using conventional techniques. A waveform data file for the synthesized waveform is created by generating a digital representation of the waveform wherein the time between the sample points corresponds to the frequency of the address timing signal of the waveform generator, and then establishing a memory storage address for each sample point. Preferably, CPU 82 is a personal computer as such computers are relatively easy to program and operate, are portable, and have standard communication interfaces through which the computer can communicate with other devices.

The waveform data file is transferred to microprocessor 84, such as a Zilog Z-180 microprocessor or the like, through communication interface 86 such as a standard serial (RS-232) or parallel communications interface on a personal computer. Microprocessor 84 transfers the data points to NVRAM device 52 such as a Dallas Semiconductor DS1225AD chip or the like which is mapped into the address space of microprocessor 84. By corresponding the memory storage addresses transferred with the data points with the address space into which the NVRAM device is mapped, microprocessor 84 can be directed to write the data points directly into NVRAM device 52. Optionally, the waveform data file can be generated without a memory storage address for each data point and microprocessor 84 can be programmed to generate a memory storage address for each data point. After microprocessor 84 has written the data points into NVRAM device 52, the NVRAM device can be removed and placed into an independent, self contained waveform generation circuit such as arbitrary waveform generator 10 shown in FIG. 2. Chip socket 88 provides an interface means to electrically connect NVRAM 52 to waveform storage system 80 while allowing the NVRAM device to be easily removed or replaced.

Transferring data between CPU 82 and NVRAM 52 through microprocessor 84 can be initiated and controlled using any of several well known techniques such as program controlled I/O, interrupt controlled I/O, or direct memory access. Additionally, for many microprocessors, including the Zilog Z-180, there are commercially available software monitors and evaluation boards which can be used to transfer data between a microprocessor and a personal computer using a standard serial or parallel communication interface.

Preferably, the data points in the waveform data file are in complimentary offset binary) before the data file is transferred to microprocessor 84. Any data conversion required to convert the data points into the proper format can be accomplished by programming CPU 82 to perform the conversion. Optionally, however, a data conversion means 90 can be arranged between microprocessor 84 and NVRAM 52 to convert the data into a format required by a digital-to-analog converter used in a waveform generator. For example, data conversion means 90 can be used to convert each data point from standard binary into complimentary offset binary code as may be required by the digital-to-analog converter. However, data conversion means 90 has a broken line in FIG. 3 because the data conversion means is an optional element of the present invention and can be omitted if a desired application does not require its use.

Referring now to FIG. 4, there is shown a sample routine to create a waveform data file from a data file comprising a series of data points conforming to sequential amplitude values of a synthesized arbitrary waveform. The C language routine of FIG. 4 reads a sample point from an ascii data file, converts the sample point to complimentary offset binary, and writes the sample point along with a memory storage address to a waveform data file. In FIG. 4, RECLEN is set to the record length of the input file, lo_ram_val is initially set to the beginning memory storage address, and OFFSET is set such that the bitwise exclusive OR operation will compliment bit b7.

The system provides a novel approach for storing and generating arbitrary waveforms and offers several significant advantages over prior art systems. First, the waveform storage device allows for relatively simple and direct programming of arbitrary waveforms on non-volatile random access memory devices as opposed to using conventional ROM programming techniques. The NVRAM devices are easily programmed by temporarily inserting the NVRAM device into a microprocessor memory space. Second, the use of a computer for synthesizing a waveform eases the generation and modification of complex waveforms. The use of a computer also allows one to sample and store complex waveforms generated by other devices. Third, the reproduce circuit is small, portable, inexpensive and comprises low power circuitry. The use of a counter/timer control provides the advantage of avoiding interrupt service overhead and timer loops associated with microprocessor programmed control of an output signal, thereby freeing the microprocessor for other purposes.

What has thus been described is a system for storing and generating arbitrary waveforms. The system provides a self-contained apparatus for storing digital representations of analog waveforms on portable memory devices and an independent apparatus for generating analog waveforms using the portable memory devices in which the digital representations of the analog waveforms have been stored. The storage device provides a computer for synthesizing waveforms and transferring a digital representation of the synthesized waveform to a microprocessor over a standard communication interface. The microprocessor then writes the digital data to the portion of the microprocessor address space where a NVRAM device is resident. The NVRAM device is removed from the storage device and placed into the generation system which will on command generate the waveform from the digital data.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for generating arbitrary waveforms comprising:

address clocking means for providing an address clock signal, said address clock signal comprising a series of regularly spaced discreet output signals;

cycle clocking means, including trigger means, for providing a cycle clock signal having a predetermined duration upon actuating said trigger means;

address generation means, connected to receive said address clock signal and said cycle clock signal, for providing an address series, said address series comprising a separate address for each of said discreet output signals received while said cycle clock signal is present;

data transfer means, connected to receive said address series, for introducing digital data from a non-volatile random access memory (NVRAM) device into said apparatus, said data transfer means being responsive to said address series and providing a digital output series comprising said digital data;

converter means, connected to receive said digital output series, for converting said digital output series to a continuous analog signal; and filter means, connected to said converter means, for conditioning said continuous analog signal.

2. The apparatus of claim 1 wherein said data transfer means further comprises interface means for electrically connecting the NVRAM device to said address generation means and to said converter means, said interface means being adapted for repeated introduction and removal of said non-volatile random access memory devices.

3. The apparatus of claim 2 wherein said address generation means comprises a plurality of counters with said counters being cascaded together.

4. The apparatus of claim 3 wherein said address generation means further includes address selection means, connected to at least one of said counters, for setting an initial address of said address series; said address selection means further being adapted to enable said initial address to be changed.

5. A system for storing an arbitrary waveform on a non-volatile random access memory (NVRAM) device and generating an analog signal using said NVRAM device comprising:

a central processing unit for synthesizing said arbitrary waveform and creating a digital representation of said arbitrary waveform, said digital representation comprising a series of sample points, each sample point equalling the amplitude of said arbitrary waveform at a different point in time;

a microprocessor connected to said central processing unit for receiving said digital representation and storing said digital representation in said NVRAM device;

address clocking means for providing an address clock signal, said address clock signal comprising a series of regularly spaced discreet output signals;

cycle clocking means, including trigger means, for providing a cycle clock signal having a predetermined duration upon actuating said trigger means;

address generation means, connected to receive said address clock signal and said cycle clock signal, for providing an address series, said address series comprising a separate address for each of said discreet output signals received while said cycle clock signal is present;

data transfer means, connected to receive said address series, for generating a digital output series comprising said series of sample points from said NVRAM device, wherein said data transfer means is responsive to said address series and provides one sample point from said series of sample points for each address within said address series;

converter means, connected to receive said digital output series, for converting said digital output series to a continuous analog signal; and filter means, connected to said converter means, for conditioning said continuous analog signal.

6. The system according to claim 5 further comprising:

storage interface means, mapped into an address range of said microprocessor, for electrically connecting said NVRAM device to said microprocessor, said storage interface means being adapted for repeated introduction and removal of an NVRAM device; and wherein said data transfer means further comprises transfer interface means for electrically connecting said NVRAM device to said address generation means and to said converter means, said interface means being adapted for repeated introduction and removal of a NVRAM device.

7. The system according to claim 6 wherein said central processing unit has a preprogrammed instruction set for converting said series of sample points from standard binary to complimentary offset binary and for calculating a memory storage address, coinciding with an address within said address range, for each sample point in said series of sample points.

8. The system according to claim 6 further comprising data conversion means, connected in series with said storage interface means and said microprocessor, for converting said series of sample points from one binary coded format to a different binary coded format.

9. The apparatus of claim 6 wherein said address generation means comprises a plurality of counters with said counters being cascaded together.

10. The apparatus of claim 9 wherein said address generation means further includes address selection means, connected to at least one of said counters, for setting an initial address of said address series; said address selection means further being adapted to enable said initial address to be changed.

* * * * *